United States Patent [19]

Takeuchi et al.

[11] Patent Number: 4,907,759
[45] Date of Patent: Mar. 13, 1990

[54] SPINNING REEL ASSEMBLY WITH ANTIFRICTION BEARING MEANS

[75] Inventors: Shinji Takeuchi; Tetsuya Shimozaki, both of Tokyo, Japan

[73] Assignee: Daiwa Seiko Co., Ltd., Tokyo, Japan

[21] Appl. No.: 140,798

[22] Filed: Jan. 5, 1988

[30] Foreign Application Priority Data

Jan. 22, 1987 [JP] Japan ................ 62-8034[U]

[51] Int. Cl.$^4$ ............................. A01K 89/02
[52] U.S. Cl. .................... 242/246; 242/302
[58] Field of Search ............ 242/84.2 R, 84.21 R, 242/84.5 A, 84.51 A; 464/45, 46, 47

[56] References Cited

U.S. PATENT DOCUMENTS

| 3,144,217 | 8/1964 | Wood | 242/84.21 R |
| 4,005,832 | 2/1977 | Yamazaki | 242/84.21 R |
| 4,196,869 | 4/1980 | Shepherd | 242/84.21 R |
| 4,416,428 | 11/1983 | Noda | 242/84.21 R |
| 4,549,702 | 10/1985 | Councilman | 242/84.5 A |

FOREIGN PATENT DOCUMENTS 614837 12/1948 United Kingdom ......... 242/84.21 R

*Primary Examiner*—Katherine A. Matecki
*Attorney, Agent, or Firm*—Cushman, Darby & Cushman

[57] ABSTRACT

A spinning reel assembly for use in fishing includes a spool shaft mounted to a spinning reel casing but movable rearwardly and forwardly, a spool for winding fishline on having an interior bore for receiving the spool shaft, and a plurality of drag plates secured within the bore, some of which may be integral with the spool. A drag adjustment knob is threaded onto the spool shaft for applying an axial force to the drag plates in order to brake the spool against rotation.

1 Claim, 3 Drawing Sheets

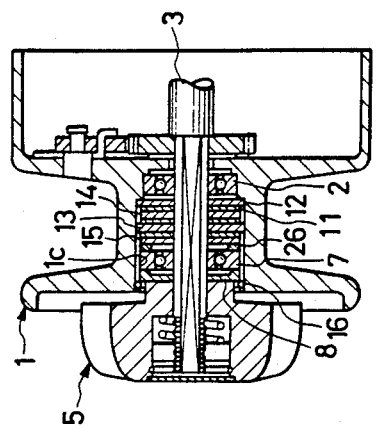
FIG. 2
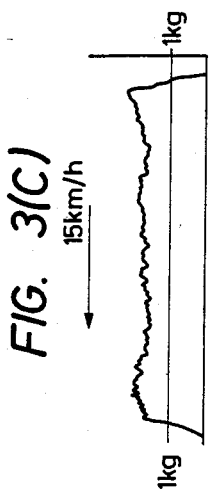
FIG. 3(C) 15km/h
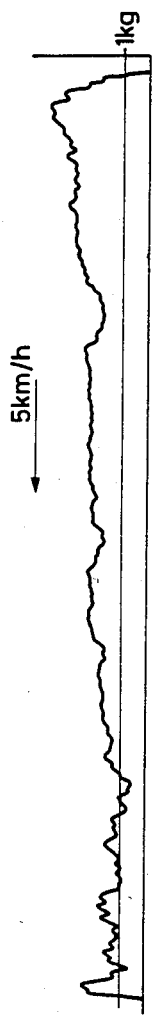
FIG. 3(A) 5km/h
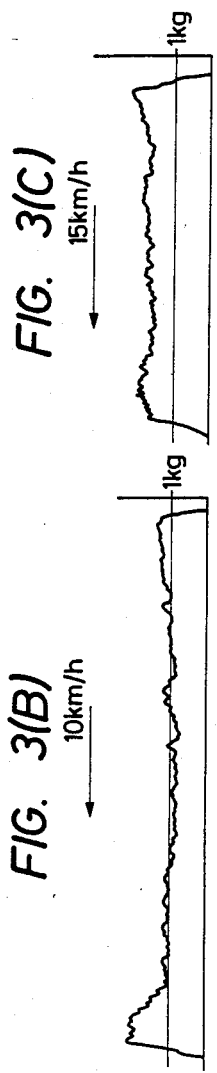
FIG. 3(B) 10km/h

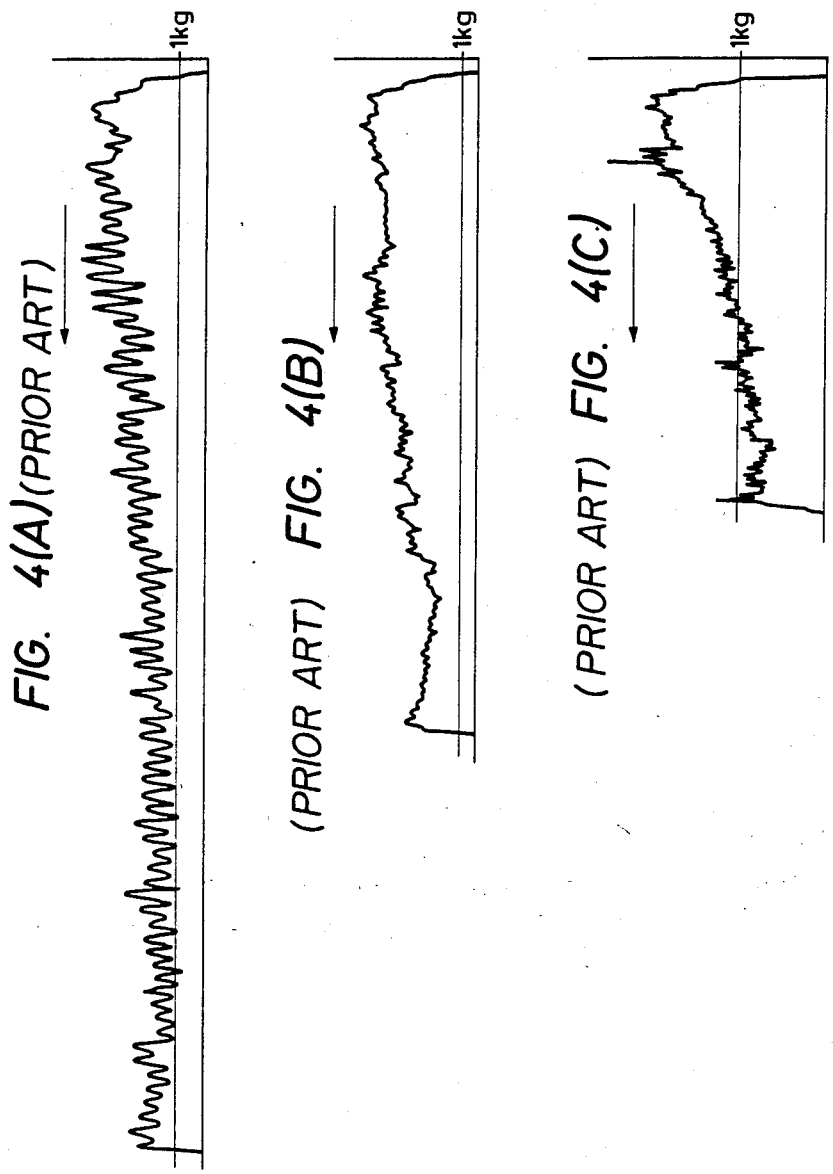

SPINNING REEL ASSEMBLY WITH ANTI-FRICTION BEARING MEANS

BACKGROUND OF THE INVENTION

1. Field of the Invention

The present invention relates to an improved drag mechanism for controlling the frictional resistance of a spinning reel. More particularly, the present invention relates to an improvement to a drag mechanism for a spinning reel of the type that utilizes a plurality of drag members to provide a braking force to the reel.

2. Description of the Prior Art

A spinning reel which is used for fishing commonly has a rotatable spool on which fishing line may be wound provided on a shaft that is secured to the body of the fishing reel. In order to facilitate smoother rotation of the spool during winding of the reel, it is known to provide a drag mechanism for frictionally engaging the spool so that line will play out when a fish runs.

In prior art devices of this type, a spool shaft attached to the spinning reel body was commonly journaled within a central bore of the fishline winding spool so that the spool was rotatable with respect to a spool shaft. In these devices, the journal bearings and drag members are typically housed in the front portion of the center bore of the spool, as shown in U.S. Pat. Nos. 4,416,428, 4,005,832 and 4,549,702.

One practical disadvantage to using journal bearings for supporting the spool of a fishing reel on the spool shaft is that the forces that are applied to the spool by the fishline as it is being wound and unwound have both an axial and radial component. As a result, the forces act on the spool to incline the spool with respect to the spool shaft, which causes the drag members to apply a variable braking force to the spool, which can cause the fishline to break and a hooked fish to escape. The uneven braking effect created by such prior art devices is illustrated in FIGS. 4A, 4B, and 4C, in which the change in tension of the fishline is represented as a function of its unwinding speed. FIG. 4A represents an unwinding speed of 5 km/h, FIG. 4B an unwinding speed of 10 km/h, and FIG. 4C an unwinding speed of 15 km/h.

Clearly, there is a long and unfilled need in the prior art for a spinning reel spool that will not skew with respect to its supporting shaft when a force having an axial component is applied thereto by a fishline.

SUMMARY OF THE INVENTION

Accordingly, it is an object of the present invention to provide a spool for a spinning reel that will not skew with respect to its supporting shaft due to forces imparted by a fishline wound thereon, thus assuring a smooth braking effect from the drag members so that the fishline will not break.

According to the present invention, a spinning reel assembly for use in fishing includes a spool shaft mounted to a spinning reel casing but movable rearwardly and forwardly, a spool having an interior bore for receiving the spool shaft and for winding fishline thereon, an anti-friction bearing within the bore for rotatably supporting the spool on the shaft, and a plurality of drag plates secured in the bore so as to be engagable with a drag adjustment knob threadingly engaged with the spool shaft, for imparting a variable axial force to the drag plates. In this way, the drag adjustment knob bears on the drag plates to provide an even braking force to the spool.

Since the spool is supported by the antifriction bearing, it will not skew with respect to the spool shaft during operation of the spinning reel, and there is no danger of the drag plates becoming misaligned as in the prior art devices. For this reason, a fisherman using a reel constructed according to the present invention may set the drag adjustment knob to the maximum test strength of the fishing line and be confident that this is the maximum drag force that will be applied.

Other objects, features and characteristics of the present invention, as well as the methods and operation and functions of the related elements of the structure and to the combination of parts and economies of manufacture, will become apparent upon consideration of the following description and the appended claims with reference to the accompanying drawings, all of which form a part of the specification, wherein like reference numerals designate corresponding parts in the various figures.

BRIEF DESCRIPTION OF THE DRAWINGS

FIG. 2 is a cross-sectional view of a second embodiment of the present invention;

FIG. 3A is a drag force braking diagram for the present invention indicating the change in tension of a fishline from an initially set level of 1 kg, at a fishline unwinding speed of 5 km/h;

FIG. 3B is a drag force braking diagram indicating the change in tension of the fishline from an initially set level of 1 kg, at a fishline unwinding speed of 10 km/h;

FIG. 3C is a drag force braking diagram indicating the change in tension of the fishline from an initially set level of 1 kg, at a fishline unwinding speed of 15 km/h;

FIG. 4A is a drag force braking diagram illustrating the change in tension of a fishline in a prior art device from an initially set level of 1 kg, at a fishline unwinding speed of 5 km/h;

FIG. 4B is a drag force braking diagram for a prior art device indicating the change in tension of the fishline from an initially set level of 1 kg, at a fishline unwinding speed of 10 km/h; and FIG. 4C is a drag force braking diagram for a prior art device indicating the change in tension of the fishline from an initially set level of 1 kg, at a fishline unwinding speed of 15 km/h.

DETAILED DESCRIPTION OF THE PREFERRED EMBODIMENT

Figure 1:
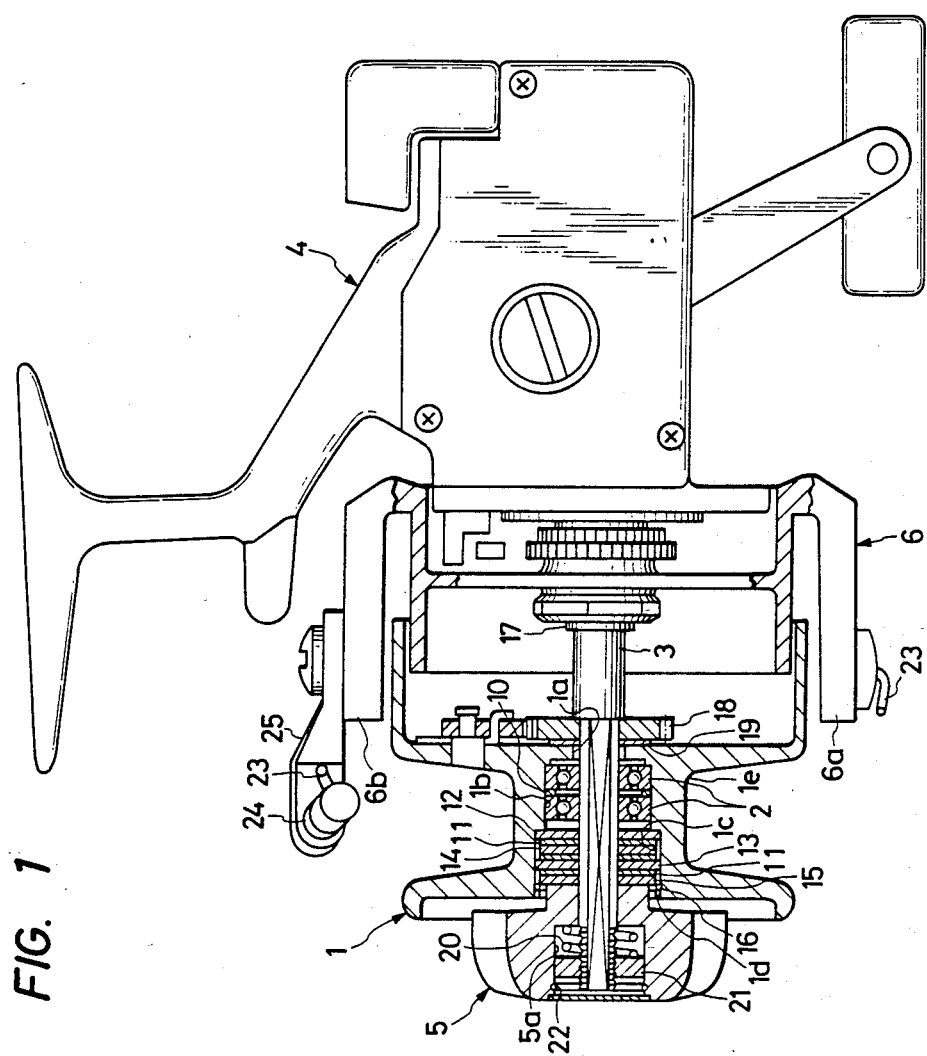
FIG. 1 is a cross-sectional view of a first embodiment of the present invention.

Referring to FIG. 1, a first embodiment of the present invention includes a spool 1 having an interior bore defined therein with a first bore portion 1c having a first diameter, a second bore portion 1b having a smaller second diameter, and a third bore portion 1a having a diameter that is smaller than either of the first or second diameters. Spool 1 further has an annular groove 1d defined within its bore adjacent to the first bore portion 1c.

As shown in FIG. 1, spool 1 is supported for rotation on a spool shaft 3 by a plurality of ball bearing members 2 which are disposed within the second bore portion 1b of the spool. A collar 10 is provided between the bearings 2 to space the bearings from each other. The inner races of the ball bearings 2 are secured to the spool shaft 3, while the outer races are secured to the spool 1.

A plurality of spacing washers 11, antirotated drag plates 12 and 13 which are secured against rotation with respect to the spool, and other drag plates 14 and 15, are secured within the first bore hole portion of the spool by the portion of the spool defining the first bore hole portion and a stop ring 16 which is provided at a forwardmost end of the first bore portion 1c.

The spool shaft 3 is inserted in a central portion of a rotary quill 17 that projects forward from the casing 4 of a spinning reel. A gear 18, a spacing washer 19, the ball bearings 2 and the drag members are sequentially fitted onto the spool shaft 3 in the forward direction from the rotary quill 17. A drag adjustment knob 5 and a drag spring 20 are also fitted onto the portion of spool shaft 3 that is distal from the rotary quill 17. A nut 21 is provided within drag adjustment knob 5 and secured against rotation with respect thereto, and is further threadedly engaged onto the forwardmost end portion of spool shaft 3. A stop ring 22 is provided within the drag adjustment knob 5 for preventing the drag spring 20 and nut 21 from coming out of the drag adjustment knob 5.

The anti-rotated drag plates 12 and 13 are inserted into the spool 1 so that the groove 1d of the spool serves to prevent the drag plates from rotating, so that the drag plates are slidable in the axial direction of the spool shaft 3. The additional drag plates 14 and 15 are inserted into the spool 1 so that they are slidable in the axial direction of the spool shaft 3, but not rotatable in the circumferential direction thereof.

The drag spring 20 and the nut 21 are inserted into the recess 5a of the drag adjustment knob 5 so that the nut is slidable in the axial direction of the knob, but not rotatable in the circumferential direction thereof.

A rotor 6 is secured to the rotary quill 17, and has peripheral portions 6a and 6b to which a bail 23, a roller 24 and an arm 25 may be attached for paying out the fishline to an attached fishing rod.

Referring to FIG. 2, a second embodiment of the present invention is illustrated wherein the ball bearings 2, 7 are provided both in front of the drag members and behind them. An anti-rotated drag plate 12 is provided as a drag member in front of the rear ball bearing 2. The front ball bearing 7 is provided on a collar 26 in front of the drag plate 15. A rotary member 8 is provided in front of the front ball bearing 7 so that the rotary number may be slidable in the axial direction of the spool shaft 3.

In each of the first and second embodiments, the spool 1 is frictionlessly rotated while being supported by the ball bearings 2, 7 on the spool shaft 3. In this way, if the drag adjustment knob 5 is set to a predetermined value corresponding to the test strength of the fishing line being used, the fisherman can confidently expect the spool to begin to rotate when that tension is reached, so that the fishline will not break and the fish will not escape. This is true even though the fishline may impart a force to the spool having both axial and radial components that would cause prior art spinning reel spools to skew relative to their supporting spool shafts.

The comparative advantage of a spinning reel constructed according to the present invention is evident in FIGS. 3A-3C, which represent the change in tension of a fishline as it is unwound from the reel, with the drag adjustment means initially set at a level of 1 kg. FIG. 3A represents the tension at an unwinding speed of 5 km/h, FIG. 3B at 10 km/h and FIG. 3C at 15 km/h. It should be noted that the variation in tension is much less than that produced by the prior art reel, shown in FIGS. 4A-4C.

Although the ball bearings are provided behind the drag members or are provided in front of the drag members and behind the drag members in the illustrated embodiments, the ball bearings may alternatively be provided only in front of the drag members. In addition, other types of anti-friction bearings, such as needle bearings, may be substituted in lieu of the ball bearings illustrated in the preferred embodiments.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A spinning reel assembly for use in fishing, comprising:
   a spool shaft mounted to a spinning reel casing but movable rearwardly and forwardly;
   spool means defining an interior bore for receiving said spool shaft, said interior bore having a first diameter portion and a second diameter portion having a smaller diameter than said first diameter portion, and an outer surface for winding fishline thereon;
   anti-friction bearing means comprising a front ball bearing member in said first diameter portion and a rear ball bearing member in said second diameter portion for rotatably supporting said spool means on said spool shaft;
   drag plate means mounted in said first diameter portion of said bore by a drag plate securing means including a stop ring mounted on said spool means for securing said drag plate means within said first diameter portion, said drag plate means being disposed between said front ball bearing member and said rear ball bearing member, said drag means being axially slidable but rotatably fixed within said first diameter portion;
   drag adjustment means threadedly engaged with said spool shaft and having a portion bearing against said front ball bearing member for applying a variable axial force to said drag plate means;
   and means for resiliently biasing said drag adjustment means relative to said spool shaft,
   whereby said drag plate means is pressed between said adjustment means and said spool means to brake the spool means against rotation.

* * * * *